(12) United States Patent
Kiuchi

(10) Patent No.: US 8,144,002 B2
(45) Date of Patent: Mar. 27, 2012

(54) ALARM SYSTEM FOR ALERTING DRIVER TO PRESENCE OF OBJECTS

(75) Inventor: Shingo Kiuchi, Chiba (KR)

(73) Assignees: Hyundai Motor Company, Seoul (KR); Kia Motors Corporation, Seoul (KR); Hyundai Motor Japan R&D Center, Inc., Chiba (JP)

(*) Notice: Subject to any disclaimer, the term of this patent is extended or adjusted under 35 U.S.C. 154(b) by 450 days.

(21) Appl. No.: 12/288,757

(22) Filed: Oct. 23, 2008

(65) Prior Publication Data

US 2009/0243880 A1   Oct. 1, 2009

(30) Foreign Application Priority Data

Mar. 31, 2008   (JP) ................................. 2008-089765

(51) Int. Cl.
*B60Q 1/00* (2006.01)
*B60R 22/00* (2006.01)
*G06K 9/00* (2006.01)

(52) U.S. Cl. .......... 340/435; 340/436; 340/438; 701/45; 382/103

(58) Field of Classification Search .................. 340/435, 340/438, 932.2, 531, 539.1; 342/69–72, 342/66; 701/29, 36–48; 382/103, 224
See application file for complete search history.

(56) References Cited

U.S. PATENT DOCUMENTS

| 6,989,754 B2* | 1/2006 | Kisacanin et al. | 340/576 |
| 7,755,473 B2* | 7/2010 | Birk et al. | 340/435 |
| 7,804,413 B2* | 9/2010 | Birk et al. | 340/576 |
| 2003/0039378 A1* | 2/2003 | Yuasa et al. | 382/104 |
| 2004/0193347 A1* | 9/2004 | Harumoto et al. | 701/45 |
| 2008/0205706 A1* | 8/2008 | Hongo | 382/104 |

FOREIGN PATENT DOCUMENTS

| JP | 62-061830 | 3/1987 |
| JP | 03-167698 | 7/1991 |
| JP | 06-262959 | 9/1994 |
| JP | 10-272961 | 10/1998 |
| JP | 11-048820 | 2/1999 |
| JP | 2000-172965 | 6/2000 |

* cited by examiner

*Primary Examiner* — Benjamin C Lee
*Assistant Examiner* — Omeed Alizada
(74) *Attorney, Agent, or Firm* — Edwards Wildman Palmer LLP; Peter F. Corless

(57) ABSTRACT

Alarm systems comprises an eye gaze direction detecting part, an obstacle detecting device and an alarm controlling part. The eye gaze direction detecting part determines a vehicle driver's field of view by analyzing facial images of a driver of the vehicle pictured by using a camera equipped in the vehicle. The obstacle detecting device detects the presence of an obstacle in the direction unobserved by the driver using a radar equipped in the vehicle, the direction of which radar is set up in the direction not attended by the driver on the basis of data detected by the eye gaze monitor. The alarm controlling part determines whether to make an alarm in case an obstacle is detected by the obstacle detecting device. The systems can detect the negligence of a vehicle driver in observing the front view targets and release an alarm to prevent the driver from any possible danger.

7 Claims, 3 Drawing Sheets

ALARM SYSTEM FOR ALERTING DRIVER TO PRESENCE OF OBJECTS

CROSS-REFERENCE TO RELATED APPLICATION

This application claims under 35 U.S.C. §119(a) the benefit of Japanese Patent Application No. 10-2008-0089765 filed Mar. 31, 2008, the entire contents of which are incorporated herein by reference.

BACKGROUND (a) Technical Field

The present invention relates to an alarm system equipped in a vehicle which can detect the negligence of a vehicle driver in observing the front view targets and release an alarm to alert the driver to avoid any possible danger.

(b) Background Art

There have been introduced many warning devices in a vehicle equipped with a camera to monitor driver's eye gaze directions and gives out an alarm against the driver in case he fails to observe the targets in his front field of view.

For example, Japanese Pat. No. 3232873 discloses a device which emits an invisible ray to the eyes of a driver and detects the direction of a driver's eye gaze based on the reflected light.

Japanese Pat. No. 4032994 discloses a method of detecting the direction a driver's eye gaze by respectively obtaining the center of the white portion and that of the black portion (pupil) of the driver's eyeball.

Japanese Patent Application Publication No. 2002-331850 discloses a device which detects target awareness of a driver by determining the driver's intention of vehicle operation behavior by analyzing his vehicle operation pattern based on the parameters calculated by using Hidden Marcov Model (HMM) for the frequency distribution of the driver's eye gaze wherein the eye gaze direction of the driver is detected as a means to determine the driver's vehicle operation direction.

Japanese Patent Application Publication No. H 11-304428 discloses a system to assist a vehicle driver for his operation by alarming a driver when he is not fully unattended to his driving in observing his front view field based on the fact that his eye blinking is not detected or an image which shows that the driver's eyeball faces the front is not detected for a certain period of time.

Japanese Patent Application Publication No. H 7-69139 discloses a device which determines the target awareness of a driver based on the distance between the two eyes of the driver calculated based on the images pictured from the side facing the driver.

As disclosed in the above-mentioned references, the conventional methods of detecting driver's target unawareness comprises: observing driver's driving behavior during vehicle operation by using a camera; and judging the driver's failure to observe front view targets in case the driver's eye gaze is failed to observe the front view target for a certain period of time thereby giving out a warning signal against the driver for negligence of front view target awareness.

However, it has not been easy to exactly judge the state of a driver with respect to the front view targets awareness by the conventional methods because the drivers' vehicle operation behaviors are very diverse and it is highly likely that many false alarms will be produced.

Further, the driver's failure to observe the front view targets for a certain period of time does not necessarily mean that the driver is placed in danger. Thus repeated release of alarms against the driver, which have not been necessary, may have been sometimes a nuisance and even make the driver immune to the alarm signal.

Therefore, the object of this invention is to provide an alarm system equipped in a vehicle which is designed to release alarm only when necessary by detecting the real danger of a driver during vehicle operation due to the driver's failure to observe the front view targets.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

In one aspect, the present invention provides an alarm system which comprises an eye gaze direction detecting part, an obstacle detecting device and an alarm controlling part. The eye gaze direction detecting part determines a vehicle driver's field of view by analyzing facial images of a driver of the vehicle pictured by using a camera equipped in the vehicle. The obstacle detecting device detects the presence of an obstacle in the direction unobserved by the driver using a radar equipped in the vehicle, the direction of which radar is set up in the direction not attended by the driver on the basis of data detected by the eye gaze monitor. The alarm controlling part determines whether to make an alarm in case an obstacle is detected by the obstacle detecting device.

In a preferred embodiment, the eye gaze direction detecting part may comprise: a camera; a device that detects driver's eye gaze direction based on the facial image data of the driver; a device that detects driver's steady eye gaze direction based on a plural number of the driver's eye gaze directions having been detected; and a device that judges an effective field of view of the driver from the detected driver's steady eye gaze direction of the driver.

In another preferred embodiment, the obstacle detecting device may comprise a radar, a radar detection direction controlling device and an obstacle detecting device.

The radar detection direction controlling device determines the direction not observed by the driver within the effective field of view and set the direction as a detection direction of the radar. The obstacle detecting device, in case an obstacle is detected, calculates relative speed of the obstacle with respect to the vehicle based on the speed and moving direction of the vehicle and obstacle, and subsequently calculates estimated time for the obstacle to reach the vehicle based on the obtained relative speed of the obstacle and the distance between the vehicle and the obstacle.

In still another preferred embodiment, the alarm controlling part may comprise an alarm determining device, an alarm controlling device and an alarm release device.

The alarm determining device, in case an obstacle is detected by the obstacle detecting device, calculates, in consideration of the chronologically recorded history of eye gaze directions recorded in a device for the chronological recordation of eye gaze directions equipped in the eye gaze direction detecting part, the time lapsed from the time when the obstacle was detected till the present time in case there has been no previous record of observing the obstacle by the driver, or the time lapsed from the time when the obstacle was last detected till the present time in case there has been a previous record of detecting the obstacle and assigns it as the time driven by the driver without front view targets awareness, and inputs into a program for determining the driver's driving without front view targets awareness at least two of the data selected from the group consisting of (i) the time driven by the driver without front view targets awareness, (ii) the estimated time for the vehicle to collide with the obstacle, (iii) the distance and direction of the obstacle from and with respect to the vehicle, and (iv) the speeds and moving directions of the vehicle and the obstacle.

The alarm controlling device sets up the type of an alarm to be released and the alarm release device releases the alarm in response to the direction of the alarm controlling device.

In a further preferred embodiment, the alarm controlling device calculates, in case the alarm determining device determines the alarm to be released, the level of danger by the obstacle by inputting into the program at least two of the data selected from the group consisting of (i) the time driven by the driver without front view targets awareness, (ii) the estimated time for the vehicle to collide with the obstacle, (iii) the distance and direction of the obstacle from and with respect to the vehicle, and (iv) the speeds and moving directions of the vehicle and the obstacle, sets up the type of alarm to be released in response to the calculated level of danger, and releases the alarm.

The alarm systems determine the driver's steady gaze by detecting the driver's eye gaze. In case a radar equipped in the vehicle detects an obstacle present in the direction not observed by the driver, the alarm systems determine the driver's awareness of the obstacle. According to the alarm systems, an alarm can be released only when the driver is determined not being aware of the obstacle, thereby avoiding unnecessary alarms. Further, driving safety can be improved.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given below by way of illustration only, and thus are not limitative of the present invention, and wherein.

DETAILED DESCRIPTION OF THE INVENTION

Figure 1:
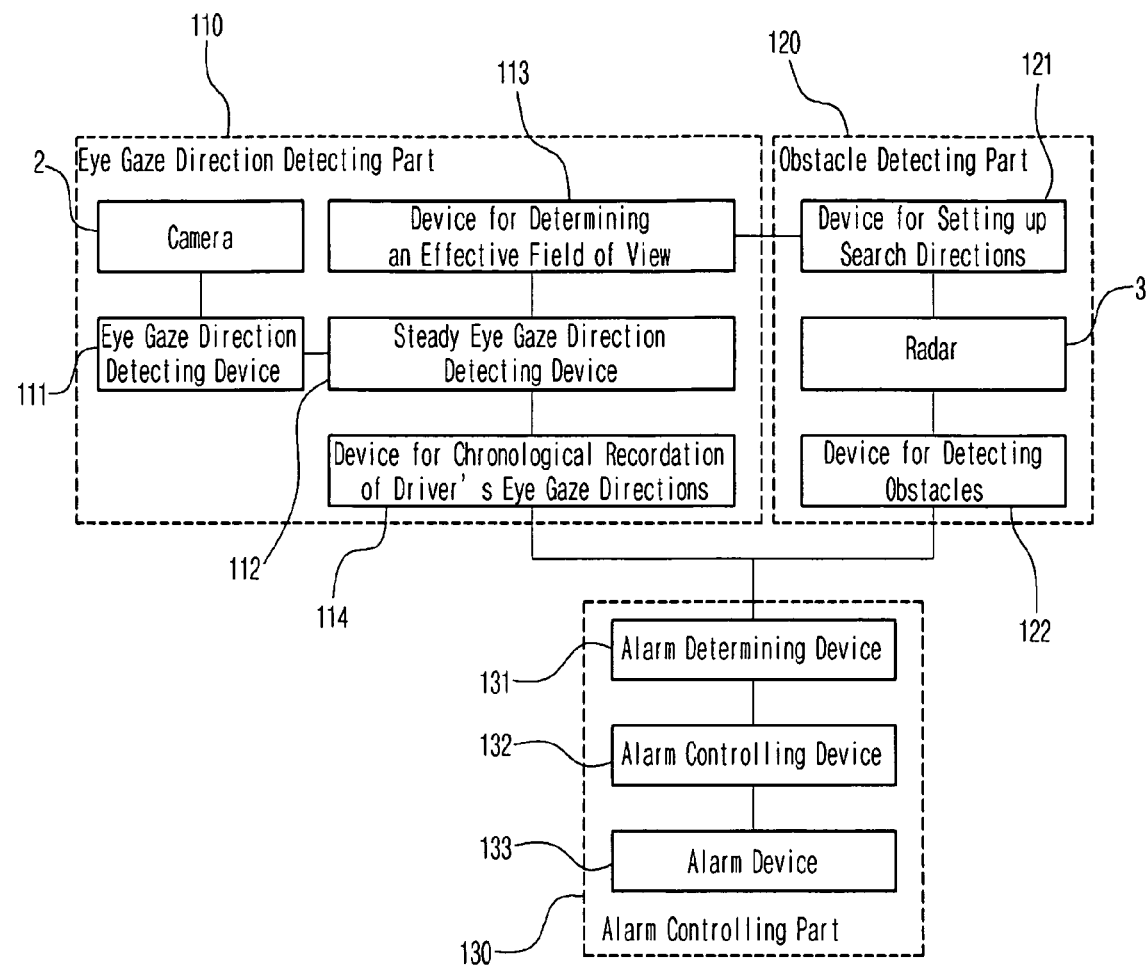
FIG. 1 shows a system block diagram of an alarm system according to an embodiment of the present invention.

Reference will now be made in detail to the preferred embodiments of the present invention, examples of which are illustrated in the drawings attached hereinafter, wherein like reference numerals refer to like elements throughout. The embodiments are described below so as to explain the present invention by referring to the figures.

FIG. 1 shows a system block diagram of an alarm system according to an embodiment of the present invention.

According to FIG. 1, the alarm system comprises an eye gaze direction detecting part 110, an obstacle detecting device 120, and an alarm controlling part 130, which are described further below.

The eye gaze direction detecting part 110 may preferably comprise a camera 2, an eye gaze direction detecting device 111, a steady eye gaze direction detecting device 112, a device for determining an effective field of view 113, and a device for recording history of steady gaze directions 114.

The facial images of a driver 6 are pictured by using a camera 2 equipped in the vehicle 1 and the image data captured thereof are processed by the eye gaze direction detecting device 111 thereby detecting the eye gaze 8 of the driver 6. The device combining the camera 2 and the eye gaze direction detecting device 111 is known as so-called eye gaze detecting apparatus. The camera 2 and the eye gaze direction detecting device 111 may be any one that can be mounted in a vehicle 1 and from which data can be retrieved.

The steady eye gaze direction detecting device 112 calculates the mean value after adding up all data of the eye gaze direction 13 of the driver 6 released by the eye gaze direction detecting device 111 to detect and release the steady eye gaze direction 16 of the driver 6. The time required for adding up the above data is preferably 0.01-1 second, more preferably 0.02-0.5 second, most preferably 0.1 second.

The device for determining an effective field of view 113 determines the view 9 based on the steady eye gaze direction 16 and the optic angle of the driver 6. There has been known a general value for the optic angle of the driver 6 during vehicle operation, and by using this, views can be calculated. The views 9 obtained here are views at movement during vehicle operation. Preferably, the device for determining an effective field of view 113 determines the effective field of view 15 by adding factors including safety rate to the views 9 and releases it.

The effective field of view 15 may be determined by first calculating an effective field of view 15 corresponding to the steady eye gaze direction 16 and inputting it into a program for determining the driver's driving without front view targets awareness 20.

The device for recording history of steady gaze directions 114 records the chronologically recorded history of steady eye gaze directions of the driver and releases it as an alarm controlling device 131.

The obstacle detecting device 120 may preferably comprise a radar 3, a device for setting up search directions 121 and an obstacle detecting device 122. The device for setting up search directions 121 and the device for detecting an obstacle 122 may suitably be integrated for the control of the radar, and information on the obstacle is released by processing the detected data of the obstacle 12.

Examples of the radar 3 may include, for example, (millimeter wave) radar, infrared radar, ultrasonic detector, stereo camera, etc. The radar to be used in the present invention may not be limited to the ones exemplified above but can be any one that can be mounted in a vehicle and can assist to calculate the distance between the vehicle and the obstacle.

The device for setting up search directions 121 determines the direction not being observed by the driver 6 within the effective range of field of view, sets up a search direction for the radar 3 to detect obstacles.

Figure 2:
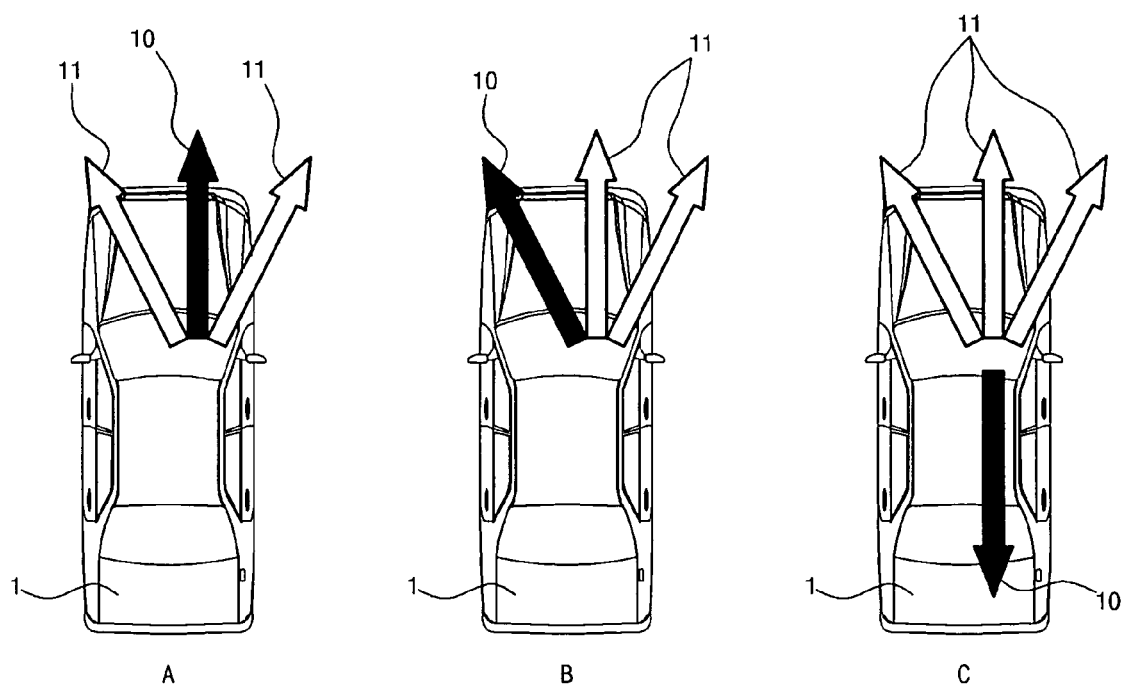
FIGS. 2A to 2C shows method of setting up a radar search direction according to an embodiment of the present invention.

FIG. 2 shows a method of setting up radar search directions according to an embodiment of the present invention. FIG.

2A shows a case where the steady gaze direction 10 of a driver is a front view straight ahead and the radar search directions 11 are field of views on both left and right sides of the driver. FIG. 2B shows a case where the steady gaze direction 10 of a driver is the left side of the driver and the radar search directions 11 are both the front view straight ahead and the field of view on the right side of the driver. FIG. 2C shows a case where the steady gaze direction 10 of a driver is the rear side of the driver (i.e., front view is not observed by the driver) and the radar search directions 11 are the front view, and field of views on both left and right sides of the driver.

The radar search directions 11 are not limited to the front view, and field of views on the left and right side of the driver, but they may cover any directions and any number of directions to be set up as necessary.

The device for detecting obstacles 122, in case it detects an obstacle 12, calculates relative speed of the obstacle with respect to the vehicle, based on the speed and moving direction of the vehicle and obstacle. Subsequently, the device for detecting obstacles calculates estimated time for the obstacle to reach the vehicle based on the obtained relative speed of the obstacle and the distance between the vehicle and the obstacle. More preferably, the estimated time for the obstacle to reach the vehicle is the one that the obstacle reaches the distance of danger of the vehicle.

Here, the distance of danger 18 is the least allowable distance between the vehicle 1 and the obstacle 12, and a closer approach between the two will be considered as a collision. The distance of danger 18 is a variable corresponding to various driving situations, which is set up considering factors such as the direction and distance of the obstacle 12, the relative speed between the vehicle 1 and the obstacle 12, the relative movement direction of the vehicle 1 and the obstacle 12, and the braking power. For example, in case the vehicle 1 is under operation at high speed or the obstacle 12 is on the same movement direction with the vehicle 1 the distance of danger 18 may be set up relatively large while in case the obstacle 12 runs in parallel in a different lane or follows the vehicle from behind it may be set up relatively small. The conditions for the distance of danger 18 can be inputted in setting up a program for determining driver's driving without front view targets awareness 20. The estimated time for arrival 17 can be calculated by using the above program for determining driver's driving without front view targets awareness 20.

The alarm controlling part 130 may preferably comprise an alarm determining device 131, an alarm controlling device 132 and an alarm device 4.

The alarm determining device 131, in case an obstacle 12 is detected by the obstacle detecting device 122, calculates, in consideration of the chronologically recorded history of eye gaze directions recorded in the device for the chronological recordation of eye gaze directions 114 equipped in the eye gaze direction detecting part 110, the time lapsed from the time when the obstacle 12 was detected till the present time in case there has been no previous record of observing the obstacle 12 by the driver 6, or the time lapsed from the time when the obstacle 12 was last detected till the present time in case there has been a previous record of detecting the obstacle 12 and assigns it as the time driven by the driver without front view targets awareness 19.

The alarm determining device 131 determines whether or not to issue an alarm in consideration of the time driven by the driver without front view targets awareness 19. The determination to issue an alarm can be made if the lapse of the time driven without front view targets awareness 19 surpasses a predetermined time period. More preferably, the alarm determining device 131 determines whether or not to issue an alarm based on calculation obtained after inputting into the program at least two of the data selected from the group consisting of (i) the time driven by the driver without front view targets awareness, (ii) the estimated time for the vehicle to collide with the obstacle, (iii) the distance and direction of the obstacle from and with respect to the vehicle, and (iv) the speeds and moving directions of the vehicle and the obstacle.

The program 20 for determining driver's driving without front view targets awareness is an optimized calculation method utilizing a variety of assumed operational situations of a vehicle 1 based on the inputted real data with regard to the distance and direction of the obstacle 12 from and with respect to the vehicle 1, the relative speed between the vehicle 1 and the obstacle 12 and their directions of movement added with the corresponding driving conditions and other relevant parameters, or is one loading in a computer the calculated results for the expected situations thereof, which enables to obtain the optimized result by calculation based on the inputted data obtained in each step. The program 20 may be also used to calculate the degree of danger 21 mentioned below as well as the effective field of view 15, the estimated time for arrival 17 and the distance of danger 18.

The alarm determining device 131, in case it judges a driving condition as driving without front view targets awareness 22, determines to issue an alarm 5 for the driving without front view targets awareness 22 and attends to its release.

The alarm controlling device 132, in case alarm determining device 131 determines to issue an alarm 5 for the driving without front view targets awareness 22, attends to the calculation of the degree of danger 21 due to the obstacle 12, and sets up the type of the alarm 5 release in response to the driving situation without observing front view targets and attends to its release.

The degree of danger 21 is calculated as follows. For example, in case an obstacle 12 approaches the vehicle 1 in a speed greater than the predetermined relative speed, it may be assigned as level 3; in case the above relative speed of the obstacle 12 is below the predetermined relative speed or is in a state of stop it may be assigned as level 2; and in case the obstacle 12 is far from the vehicle 1 or is getting distant from the vehicle 1, or the time driven by the driver 6 without front view targets awareness exceeds a predetermined time period although there is no obstacle 12 detected, it may be assigned as level 1.

Preferably, the alarm controlling device 132 determines the specific level of the degree of danger 21 due to the obstacle 12 based on calculation obtained after inputting into the program at least two of the data selected from the group consisting of (i) the time driven by the driver without front view targets awareness, (ii) the estimated time for the vehicle to collide with the obstacle, (iii) the distance and direction of the obstacle from and with respect to the vehicle, and (iv) the speeds and moving directions of the vehicle and the obstacle.

The alarm controlling device 132, in response to the degree of danger 21, sets up the type of alarm release and attends to its release.

The type of alarm 5 release designed to warn against the driving without front view targets awareness 22 may be set up as follows.

The degree of danger 21 is assigned in the order of from the greatest level to the lowest as level 3, level 2 and level 1. For level 3, a warning flare against the driving without front view targets awareness is lighted concurrently with the issuance of a honk honkat the sound pressure of 60~100 dBSPL, preferably, 65~90 dBSPL, more preferably 75~85 dBSPL. For level 2, a warning flare against the driving without front view targets awareness is lighted concurrently with the issuance of a honk honkat the sound pressure of 30~70 dBSPL, preferably, 40~65 dBSPL, more preferably 55~65 dBSPL. For level 1, a warning flare against the driving without front view targets awareness is lighted or a honk is released honkat the sound pressure of 30~70 dBSPL, preferably, 40~65 dBSPL, more preferably 55~65 dBSPL.

Alarm device 4 issues an alarm against the driving without front view targets awareness according to the alarm type generated by the alarm controlling device 132.

Figure 3:
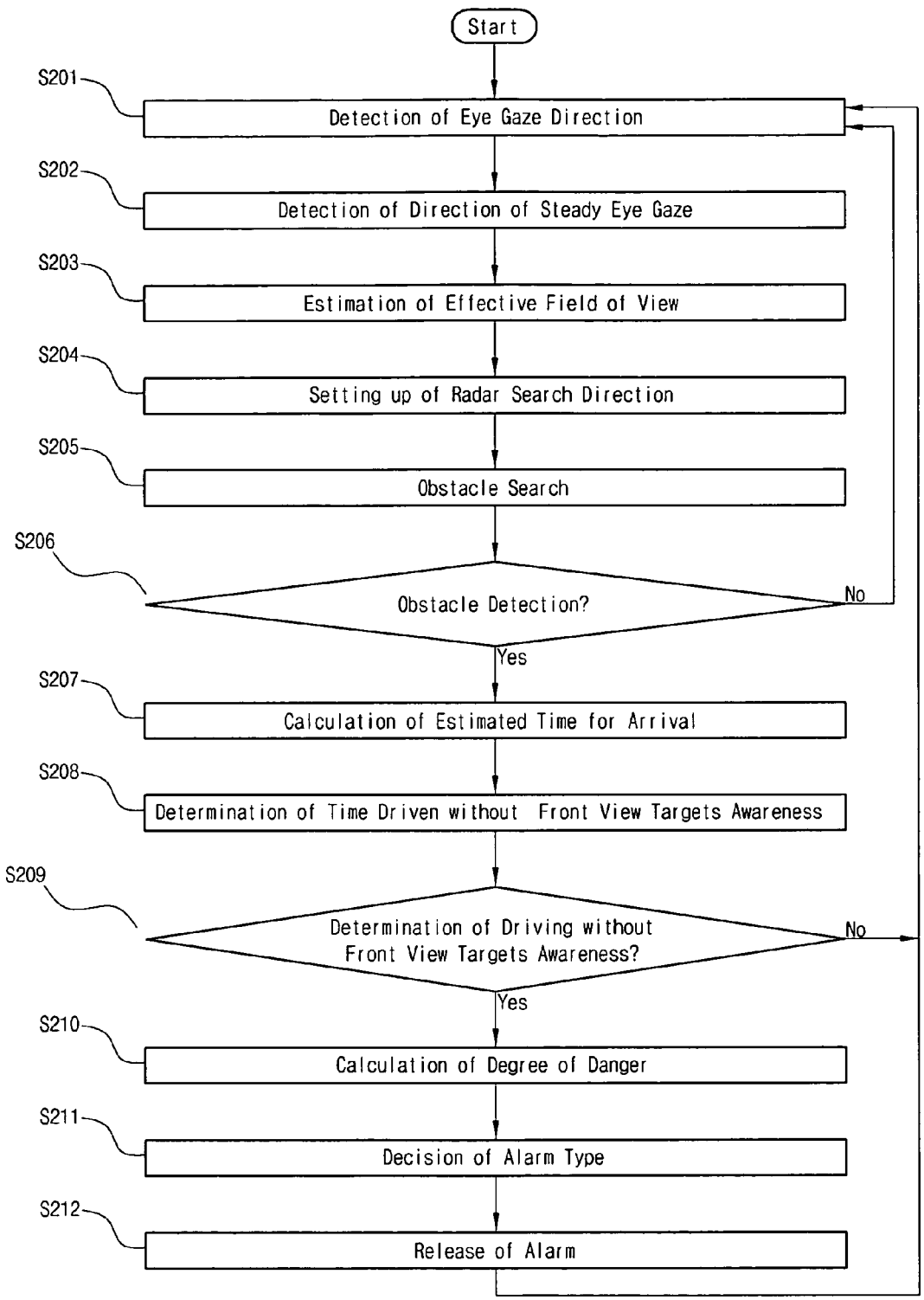
FIG. 3 is a flow chart showing a method for alerting a driver according to an embodiment of the present invention.

FIG. 3 is a flow chart showing an example of the operation of an alarm system according to an embodiment of the present invention.

The eye gaze direction detecting device 111 detects a driver's gaze direction based on the information obtained by a camera 2 equipped in the driver's vehicle 1 and the facial image data 7, and subsequently, the steady eye gaze direction detecting device 112 detects the steady eye gaze direction 16 of the driver 6 based on a plurality of eye gaze directions 13 inputted (S202).

The device for determining an effective field of view 113 determines the effective field of view based on the steady eye gaze direction 16 of the driver 6 (S203).

The device for setting up search directions 121 determines the directions not observed by the driver within the effective field of view 15 and sets up the radar search directions to those directions (S204).

The device for detecting obstacles 122 detects the presence of any obstacles (S205) near the vehicle. When it detects an obstacle 12 (S206), it calculates the estimated time 17 for the obstacle to reach the vehicle 1 based on the distance between the vehicle 1 and the obstacle 12 and the relative speed (S207).

The alarm determining device 131, in consideration of the chronologically recorded history of driver's eye gaze directions 14 recorded in the device for chronologically recorded history of driver's eye gaze directions 114, calculates the time driven without front view targets awareness (S208). The alarm determining device 131 also determines whether the state of the driver's driving is one without front view targets awareness, by inputting into the program 20 at least two of the data selected from the group consisting of (i) the time driven by the driver without front view targets awareness, (ii) the estimated time for the vehicle to collide with the obstacle, (iii) the distance and direction of the obstacle from and with respect to the vehicle, and (iv) the speeds and moving directions of the vehicle and the obstacle.

In case the state of the driver's driving is determined as one without front view targets awareness, the alarm determining device 131 determines to issue an alarm against the driving without front view targets awareness 5 and attends to its release (S209).

The alarm controlling device 132, in case the alarm determining device 131 determines to issue an alarm against the driving without front view targets awareness 5, calculates the degree of danger 21 due to the obstacle 12 based on the data in the device for detecting obstacles 122 (S210), determines the type of alarm release against the driving without front view targets awareness 5 in response to the above degree of danger 21 and attends to its release (S211). The alarm device 4 releases an alarm against the driving without front view targets awareness 5 with the alarm type as determined by the alarm controlling device 132 (S212).

EXAMPLES

As discussed above, a program for determining against driving without front view targets awareness is used in the calculation of the degree of danger as well as in the judgment of whether the state of driving belongs to one without front view targets awareness. For further illustration of the present invention, hereunder, methods for determining the state of driving and calculating the degree of danger without using the program will be described. However, it should be noted that the examples given below are for the purpose of better illustration of the present invention and are not intended to limit the same.

The facial images of a driver 6 in the vehicle 1 were captured by using a camera 2, and the captured images were processed to detect the steady eye gaze direction of the driver 6. And the directions not being attended by the driver was searched by using a radar 3.

In case an obstacle 12 detected in the radar 3 is approaching the vehicle 1 from the distance of x [m] apart from the vehicle 1 at the speed of y [m/sec] and the driver 6 has not been observing the obstacle 12 for the time of z [sec]; (i) if the x, y and z meet $x/y \leq z$, the alarm level was assigned level 3, (ii) if they meet $x/y > z$, the alarm level was assigned level 2, and (iii) if the obstacle 12 becomes far off from the vehicle 1 or the effective field of view 15 of the driver 6 has been distracted from the direction of the vehicle movement for a predetermined time period although the radar 3 does not detect any obstacle, the alarm level was assigned level 1.

In case of the alarm level 3, a warning flare against the driving without front view targets awareness was lighted concurrently with a warning sound of sound pressure of 80 dBSPL. For level 2, a warning flare against the driving without front view targets awareness was lighted concurrently with a warning sound of 60 dBSPL. For level 1, a warning flare against the driving without front view targets awareness was lighted or a warning sound of 60 dBSPL is emitted.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An alarm system of a vehicle comprising:
   (a) an eye gaze direction detecting part which determines a vehicle driver's field of view by analyzing facial images of a driver of the vehicle pictured by using a camera equipped in the vehicle;
   (b) an obstacle detecting device which detects the presence of an obstacle in the direction unobserved by the driver using a radar equipped in the vehicle, the direction of which radar is set up in the direction not attended by the driver on the basis of data detected by the eye gaze monitor; and
   (c) an alarm controlling part which determines whether to make an alarm in case an obstacle is detected by the obstacle detecting device,
   wherein the alarm controlling part calculates, in case the alarm controlling part determines the alarm to be released, the level of danger by the obstacle by inputting into the program at least two of the data selected from the group consisting of (i) the time driven by the driver without front view targets awareness, (ii) the estimated time for the vehicle to collide with the obstacle, (iii) the distance and direction of the obstacle from and with respect to the vehicle, and (iv) the speeds and moving directions of the vehicle and the obstacle, sets up the type of alarm to be released in response to the calculated level of danger, and releases the alarm, and the level of danger is assigned in the order of from the greatest level to the lowest as level 3 level 2 and level I, wherein, for level 3, a warning flare against the driving without front view targets awareness is lighted concurrently with the issuance of a honk honkat the sound pressure of 60-100 dBSPL, wherein for level 2, a warning flare against the driving without front view targets awareness is lighted concurrently with the issuance of a honk honkat the sound pressure of 30-70 dBSPL, wherein for level I, a warning flare against the driving without front view targets awareness is lighted or a honk is released honkat the sound pressure of 30-70 dBSPL.

2. The alarm system of a vehicle according to claim 1, wherein the eye gaze direction detecting part comprises:
   a camera;
   a device that detects driver's eye gaze direction based on the facial image data of the driver;
   a device that detects driver's steady eye gaze direction based on a plural number of the driver's eye gaze directions having been detected; and
   a device that judges an effective field of view of the driver from the detected driver's steady eye gaze direction of the driver.

3. The alarm system of a vehicle according to claim 1, wherein the obstacle detecting device comprises:
   a radar;
   a radar detection direction controlling device which determines the direction not observed by the driver within the effective field of view and set the direction as a detection direction of the radar; and
   an obstacle detecting device which, in case an obstacle is detected, calculates relative speed of the obstacle with respect to the vehicle based on the speed and moving direction of the vehicle and obstacle, and subsequently calculates estimated time for the obstacle to reach the vehicle based on the obtained relative speed of the obstacle and the distance between the vehicle and the obstacle.

4. The alarm system of a vehicle according to claim 1, wherein the alarm controlling part comprises:
   (a) an alarm determining device which, in case an obstacle is detected by the obstacle detecting device, calculates, in consideration of the chronologically recorded history of eye gaze directions recorded in a device for the chronological recordation of eye gaze directions equipped in the eye gaze direction detecting part, the time lapsed from the time when the obstacle was detected till the present time in case there has been no previous record of observing the obstacle by the driver, or the time lapsed from the time when the obstacle was last detected till the present time in case there has been a previous record of detecting the obstacle and assigns it as the time driven by the driver without front view targets awareness, and inputs into a program for determining the driver's driving without front view targets awareness at least two of the data selected from the group consisting of (i) the time driven by the driver without front view targets awareness, (ii) the estimated time for the vehicle to collide with the obstacle, (iii) the distance and direction of the obstacle from and with respect to the vehicle, and (iv) the speeds and moving directions of the vehicle and the obstacle;
   (b) an alarm controlling device that sets up the type of an alarm to be released; and
   (c) an alarm release device that releases the alarm in response to the direction of the alarm controlling device.

5. The alarm system of a vehicle according to claim 4, wherein the alarm controlling device calculates, in case the alarm determining device determines the alarm to be released, the level of danger by the obstacle by inputting into the program at least two of the data selected from the group consisting of (i) the time driven by the driver without front view targets awareness, (ii) the estimated time for the vehicle to collide with the obstacle, (iii) the distance and direction of the obstacle from and with respect to the vehicle, and (iv) the speeds and moving directions of the vehicle and the obstacle, sets up the type of alarm to be released in response to the calculated level of danger, and releases the alarm.

6. The alarm system of a vehicle according to claim 1, wherein the level of danger is calculated, in case an obstacle approaches the vehicle in a speed greater than the predetermined relative speed, wherein the level of danger is assigned as level 3; in case the relative speed of the obstacle is below the predetermined relative speed or is in a state of stop the level of danger it is assigned as level 2; and in case the obstacle is far from the vehicle or is getting distant from the vehicle, or the time driven by the driver without front view targets awareness exceeds a predetermined time period although there is no obstacle detected, wherein the level of danger is assigned as level I.

7. The alarm system of a vehicle according to claim 1, wherein the level of danger is assigned in the order of from the greatest level to the lowest as level 3, level 2 and level I, in case an obstacle detected in the radar is approaching the vehicle 1 from the distance of x [m] apart from the vehicle at the speed of y [m/sec] and the driver has not been observing the obstacle for the time of z [sec]; (i) if the x, y and z meet $x/y \leqq z$, the alarm level is assigned level 3, (ii) if they meet $x/y<z$, the alarm level is assigned level 2, and (iii) if the obstacle becomes far off from the vehicle or the effective field of view of the driver has been distracted from the direction of the vehicle movement for a predetermined time period although the radar does not detect any obstacle, the alarm level is assigned level I.

* * * * *